(12) United States Patent
Foushee, Jr. et al.

(10) Patent No.: US 8,037,402 B2
(45) Date of Patent: Oct. 11, 2011

(54) METHOD AND SYSTEM FOR FLEXIBLE CREATION AND PUBLICATION OF FORMS

(75) Inventors: Robert Foushee, Jr., Roswell, GA (US); Sanjay Singh Thakur, Fremont, CA (US); Rohit Kulkarni, Sunnyvale, CA (US); Saurabh Dewan, Andhra Pardesh (IN); Manish Srivastava, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1244 days.

(21) Appl. No.: 11/365,260

(22) Filed: Feb. 28, 2006

(65) Prior Publication Data

US 2007/0192679 A1  Aug. 16, 2007

Related U.S. Application Data

(60) Provisional application No. 60/772,990, filed on Feb. 13, 2006.

(51) Int. Cl.
*G06F 17/21* (2006.01)

(52) U.S. Cl. ...................................................... 715/223

(58) Field of Classification Search .................. 715/506, 715/223
See application file for complete search history.

(56) References Cited

U.S. PATENT DOCUMENTS

| | | | | |
|---|---|---|---|---|
| 7,051,273 | B1* | 5/2006 | Holt et al. | 715/226 |
| 2002/0143692 | A1* | 10/2002 | Heimermann et al. | 705/37 |
| 2002/0198935 | A1* | 12/2002 | Crandall et al. | 709/203 |
| 2003/0007014 | A1* | 1/2003 | Suppan et al. | 345/853 |
| 2003/0145018 | A1* | 7/2003 | Hitchcock et al. | 707/104.1 |
| 2004/0205611 | A1* | 10/2004 | Minninger | 715/522 |
| 2005/0096938 | A1* | 5/2005 | Slomkowski et al. | 705/1 |
| 2005/0262130 | A1* | 11/2005 | Mohan | 707/102 |
| 2005/0273573 | A1* | 12/2005 | Liu et al. | 711/206 |
| 2006/0129583 | A1* | 6/2006 | Catorcini et al. | 707/101 |
| 2006/0190810 | A1* | 8/2006 | Piersol | 715/506 |

OTHER PUBLICATIONS http://simap.eu.int/List_of_OJ_S_eSenders/wai/list_of_ojs_esenders_en.html.
http://www.iasta.com/default/~page/solutions_erfx~/index.jasp.
http://www.innovasion.dk/1.html.
http://www.atkearneyprocurementsolutions.com/solutions/rfp.html.
http://www.exostar.com/sourcepass/auctions_sheet.asp. http://www.bravosolution.com/cgi-bin/toolkit/bravosolution/bs/home.jsp?area=solutions&menu=esop.
http://www.ogcbuyingsolutions.gov.uk/esourcing/about/esourcing_about_benefits.asp.
http://www.ogc.gov.uk/index.asp?docid=2314.

* cited by examiner

*Primary Examiner* — Laurie Ries
*Assistant Examiner* — Tionna Smith
(74) *Attorney, Agent, or Firm* — Kilpatrick Townsend & Stockton LLP

(57) ABSTRACT

A method for creating an electronic form for publication comprising responsive to first user input allowing a user to create the electronic form using a form-creating user interface wherein the user defines the fields and their values for the electronic form that is modeled after format information as specified by an entity; responsive to second user input allowing a user to fill in the electronic form to create a populated form; automatically creating the electronic message compliant with the format information; and transmitting the electronic message to the entity for publication. The user interface allows the user to create the form in compliant with the format information, thereby automating the process for flexible creation and publication of forms without a need to modify the software program for each entity, hence eliminating the manual process and saving time and money as well as creating more competition in the market.

20 Claims, 14 Drawing Sheets

CONTRACT NOTICE

Works ☐

Supplies ☐

Services ☐

| Reserved for the Publication Office |
|---|
| Date of receipt of the notice _____ |
| Identifier _____ |

Is this contract covered by the Government Procurement Agreement (GPA)? NO ☐ YES ☐

SECTION I: CONTRACTING AUTHORITY

I.1) OFFICIAL NAME AND ADDRESS OF THE CONTRACTING AUTHORITY

| Organisation | For the attention of |
|---|---|
| Address | Postal Code |
| Town | Country |
| Telephone | Fax |
| Electronic mail (e-mail) | Internet address (URL) |

*Fig. 3*

Sourcing

Home Login Preferences Help Diagnostics

Requests | Negotiations | Intelligence | Administration

Administration
Abstract and Forms

Manage Sections and Fields

[Create Form]

| Type | Name | Version | Description | Code | Status | Update |
|---|---|---|---|---|---|---|
| Abstract | Abstract | 1 | | ABSTRACT | Active | ✎ |
| Form | Contract Award Notice | 1 | Contract Award Notice | CONT_AWARD_NOTICE | Active | ✎ |
| Form | Contract Award Notice-DFID | 1 | Contract Award Notice | DF_CONT_AWARD_NOTICE | Active | ✎ |
| Form | Contract Award Notice-copied | 1 | Contract Award Notice | RK_CONT_AWARD_NOTICE | Active | ✎ |
| Form | Contract Notice | 1 | Contract Notice | CONTRACT_NOTICE | Active | ✎ |
| Form | Contract Notice-DFID | 1 | Contract Notice | DF_CONTRACT_NOTICE | Active | ✎ |
| Form | Contract Notice-copied | 1 | Contract Notice | RK_CONTRACT_NOTICE | Active | ✎ |

Sourcing

Home Logout Preferences Help Personalize Page Diagnostics
Requests Negotiations Intelligence Administration

Administration > Abstract and Forms >
Manage Sections and Fields

Manage Value Sets

Search
Please enter your search criteria and select the "Go" button to see the result. Note that the search is case insensitive.

510 — Name [A%]
520 — Code [ ]
550 — [Go] [Clear]

540 — [Create Field] [Create Section]

| Type | Name | Version | Description | Code | Value Type | Source | Status | 530 Update |
|---|---|---|---|---|---|---|---|---|
| Section | ANNEX A | 1 | ANNEX A | ANNEX_A | | | Active | ✎ |
| Section | ANNEX B INFORMATION ABOUT LOTS | 1 | INFORMATION ABOUT LOTS | ANNEX_A | | | Active | ✎ |
| Section | ANNEX CONTRACT AWARD NOTICE | 1 | ANNEX CONTRACT AWARD NOTICE | ANNEX_CONTRACT_AWARD | | | Active | ✎ |

*Fig. 5*

Sourcing

Home Logout Preferences Help Diagnostics
Requests / Negotiations / Intelligence / Administration

Administration > Abstract and Forms > Manage Sections and Fields

Create Field

* Indicates required field

Cancel    Manage Value Sets — 670    Apply

610 — * Code: FIRST NAME
620 — * Name: First Name
630 — Description: This is the First Name for the buyer creating the negotiation.
640 — Value Type: Text
650 — List Of Values:
660 — Status: Draft Cancel    Manage Value Sets    Apply

```xml
<?xml version="1.0" ?>
<xsd:schema mins:xsd="http://www.w3.org/2000/10/XMLSchema">
  <xsd:element name="CONTRACT_NOTICE">
    <xsd:complexType>
      <xsd:sequence>
        <xsd:element name="CONTRACT_NOTICE_ROW" minOccurs="0" maxOccurs="unbounded">
          <xsd:complexType>
            <xsd:sequence>
              <xsd:element name="FORM_PK_VALUE" type="xsd:double" minOccurs="0" />
              <xsd:element name="OWNING_ENTITY_CODE" type="xsd:string" nullable="true" minOccurs="0" />
              <xsd:element name="ENTITY_PK1" type="xsd:string" nullable="true" minOccurs="0" />
              <xsd:element name="CTYPE" type="xsd:string" nullable="true" minOccurs="0" />
              <xsd:element name="CTYPE_NM" type="xsd:string" nullable="true" minOccurs="0" />
              <xsd:element name="COVERED_BY_GPA_YES_NO" type="xsd:string" nullable="true" minOccurs="0" />
              <xsd:element name="COVERED_BY_GPA_YES_NO_AM" type="xsd:string" nullable="true" minOccurs="0" />
              <xsd:element name="LANGUAGE" type="xsd:string" nullable="true" minOccurs="0" />
              <xsd:element name="LANGUAGE_NM" type="xsd:string" nullable="true" minOccurs="0" />
              <xsd:element name="CATEGORY" type="xsd:string" nullable="true" minOccurs="0" />
              <xsd:element name="CATEGORY_NM" type="xsd:string" nullable="true" minOccurs="0" />
              <xsd:element name="SENDER" />
              <xsd:complexType>
                <xsd:sequence>
                  <xsd:element name="SENDER_ROW" minOccurs="0" maxOccurs="unbounded">
                    <xsd:complexType>
                      <xsd:sequence>
                        <xsd:element name="ROW_NUM" type="xsd:integer" nullable="true" minOccurs="0" />
                        <xsd:element name="LOGIN" type="xsd:string" nullable="true" minOccurs="0" />
                        <xsd:element name="USER_ADDRESS" >
                          <xsd:complexType>
                            <xsd:sequence>
                              <xsd:element name="USER_ADDRESS_ROW" minOccurs="0" maxOccurs="unbounded"
```

*Fig. 9*

| AML Publisher | | | Home | Logout | Preferences | Help | Personalize Page | Diagnostics |

Data Definitions

Search

Name [ ]  Code [ ]
Application [Sourcing]  Active [Yes ▼]
[Go]

*Templates* / *Data Definitions* ~ 1030

1010 ⌐ 1040

[Create Data Definition]

| Name | Application | Start Date | End Date | Update |
|---|---|---|---|---|
| Data Source for Sourcing from 'CONTRACT NOTICE: | Sourcing | 06-Dec-2004 | | ✏ |
| Data Source for Sourcing from CON AWARD NOTICE: | Sourcing | 06-Dec-2004 | | ✏ |
| Data Source for Sourcing from RES21:1: | Sourcing | 08-Mar-2005 | | ✏ |
| Sourcing Data Source | Sourcing | 08-Apr-2004 | | ✏ |

```
<?xml version="1.0" encoding="UTF-8" ?>
- <CONTRACT FORM="1" CATEGORY="ORIGINAL" LG="EN">
  - <SENDER>
     <LOGIN>USR01</LOGIN>
    - <USER>
        <ORGANISATION>Oracle Corporation</ORGANISATION>
        <ADDRESS>500 Oracle Parkway</ADDRESS>
        <TOWN>Redwood Shores</TOWN>
        <COUNTRY VALUE="US" />
      </USER>
      <NO_DOC_EXT>123XML123</NO_DOC_EXT>
    </SENDER>
  - <FD_CONTRACT CTYPE="SERVICES">
    - <AUTHORITY_CONTRACT>
      - <ADDRESS_AUTHORITY>
          <ORGANISATION>Oracle Corporation</ORGANISATION>
          <ADDRESS>500 Oracle Parkway</ADDRESS>
          <TOWN>Redwood Shores</TOWN>
          <COUNTRY VALUE="US" />
        </ADDRESS_AUTHORITY>
```

*Fig. 13*

METHOD AND SYSTEM FOR FLEXIBLE CREATION AND PUBLICATION OF FORMS

RELATED U.S. PATENT APPLICATION

This Application claims the benefit of a commonly-owned U.S. provisional application Ser. No. 60/772,990, filed on Feb. 13, 2006, Robert Foushee et al., and titled "A method and System for Flexible Creation and Publication of Forms," which is incorporated herein by reference.

BACKGROUND

1. Technical Field

The present invention relates to the field of computer systems. More particularly, embodiments of the present invention relate to a method and system for flexible creation and publication of electronic forms.

2. Background Art

With increasing use of electronic negotiations and transactions, many organizations have requirements to publish summary information concerning negotiations to a third party system as well as other internal and external systems. For example, public sector entities have numerous rules and regulations that guide their purchasing processes from building and maintaining roads to maintaining parks. Other examples requiring publishing summary information include European Union's requirement to publish all negotiations over a certain threshold on the Tenders Electronic Daily (TED), or the U.S. Federal government's requirement to publish all negotiations over $25,000 on the website, FedBizOpps.gov. One of the reasons for regulations like the ones mentioned above is to ensure that funds are not being spent unwisely or unethically as well as to allow suppliers and vendors equal opportunity to participate in such transactions, which in turn creates competition and lowers costs.

In order to meet these requirements, public sector entities need to publish their procurement of request for quotations (RFQ), auction, tender, solicitation or the like on their external websites. To comply with these requirements, organizations manually print the forms, manually enter the information and transmit via facsimile the form to the agency requiring the form. The agency then publishes the form on centrally administered electronic bulletin boards. Furthermore, the agency had to manually enter and maintain the information, to display it on their external facing web sites such that suppliers could view all ongoing procurement activities.

Unfortunately this manual process is a tedious process and prone to error. Furthermore, this manual process is costly to implement because of its need for a workforce to carryout the manual process described. Additionally, current software programs for this process are unique for each organization and need to be modified for each organization according to each organization's particular format requirement.

SUMMARY

Accordingly, a need has risen to automate the process for creation and transmission of forms electronically as well as a need for a flexible application that can be used to create the required forms without a need to modify the software program for each organization. It will become apparent to those skilled in the art after reading the detailed description of the present invention that the present invention remedies the above mentioned needs.

In one embodiment of the present invention, a user interface allows a user to create an electronic form modeled after format information as specified by an entity. The user creates the form by specifying fields and values for those fields and by further grouping the created fields to create sections and grouping sections to create pages of the form. The created form is then presented to a user where the user enters data in order to create a populated form. An electronic message is automatically created from the populated form in compliance with the format information specified by the entity. The created electronic message may be then transmitted to the entity, e.g., for publication. The populated form may be saved and archived for later retrieval.

As a result of this automated process for flexible creation and publication of forms, forms can be created without a need to modify the software program for each entity. In other words, the same software application can be used to create many different forms from different entities and transmit those forms for publication thereof. Moreover, embodiments of the present invention eliminate the need to print the forms as well as eliminate the need to manually enter the information and to manually transmit via facsimile the form to the entity requiring the form. Furthermore, the embodiments of the present invention eliminate the need for entities that require the forms to manually enter and maintain the information in order to display it on their external facing websites such that suppliers could view all ongoing procurement activities. Consequently, embodiments of the present invention provide a flexible automated process for creating and publishing forms that save time as well as create more competition in the market.

More specifically, an embodiment of the present invention pertains to a method of creating an electronic form for publication thereof, the method includes responsive to first user input, allowing a user to create the electronic form using a form-creating user interface wherein the form-creating user interface is operable to allow the user to specify fields and allow values for the fields within the electronic form, wherein the electronic form is modeled after format information specified by an entity. The method further includes responsive to second user input, allowing a user to fill in the electronic form with data to create a populated form; automatically creating an electronic message compliant with the format information based on the populated form; and transmitting the electronic message to the entity for publication thereof by the entity.

Embodiments include the above and wherein the form-creating user interface is further operable to allow a user to specify a mapping between the fields of the electronic form and the format information. Embodiments of the present invention also include the above and wherein the entity is a government entity and wherein the electronic form is related to procurement. Embodiments further include the above and wherein the form-creating user interface is further operable to allow a user to group fields into sections and further operable to allow a user to group sections into pages wherein the electronic form comprises one or more pages. Moreover, embodiments include the above and wherein the fields are specified by searching and selecting available fields stored in a database. Additionally, embodiments include the above and wherein the form-creating user interface is presented in a pop-up window, or a dropdown menu, or a tabular format or HTML form or a combination thereof. Furthermore, embodiments include the above and wherein the generated electronic message is in extensible markup language (XML) format.

Embodiments further include a system for creating an electronic form for publication thereof, the system includes a first user interface to allow a user to specify fields and allowed values for the fields within the electronic form, wherein the electronic form is modeled after format information specified by an entity; a second user interface coupled to the first user interface to allow a user to fill in the electronic form with data to create a populated form; a form generator coupled to the second user interface for automatically creating an electronic message compliant with the format information based on the populated form; and a transmitter coupled to the form generator for transmitting the electronic message to the entity for publication thereof by the entity.

Embodiments include the above and wherein the first user interface is further operable to allow a user to specify a mapping between the fields of the electronic form and the format information. Embodiments further include the above and wherein the form-creating user interface is further operable to allow a user to group fields into sections and further operable to allow a user to group sections into pages wherein the electronic form comprises one or more pages. Moreover, embodiments further include the above and wherein the generated electronic message is in extensible markup language (XML) format.

Furthermore, embodiments include a computer-useable medium having computer-readable program code stored thereon for creating an electronic form for publication thereof, the method includes responsive to first user input, allowing a user to create the electronic form using a form-creating user interface wherein the form-creating user interface is operable to allow the user to specify fields and allow values for the fields within the electronic form, wherein the electronic form is modeled after format information specified by an entity; responsive to second user input, allowing a user to fill in the electronic form with data to create a populated form; automatically creating an electronic message compliant with the format information based on the populated form; and transmitting the electronic message to the entity for publication thereof by the entity.

Embodiments include the above and wherein the form-creating user interface is further operable to allow a user to specify a mapping between the fields of the electronic form and the format information. Embodiments further include the above and wherein the form-creating user interface is further operable to allow a user to group fields into sections and further operable to allow a user to group sections into pages wherein the electronic form comprises one or more pages. Moreover, embodiments further include the above and wherein the generated electronic message is in extensible markup language (XML) format.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 shows an exemplary Contract Notice form as required by European Union Publications Office.

FIG. 4 shows an exemplary screenshot of a user interface for Abstract and Forms according to one embodiment of the present invention.

FIG. 5 shows an exemplary screenshot of a user interface to Manage Sections and Fields according to one embodiment of the present invention.

FIG. 6 shows an exemplary screenshot of a user interface to Create Fields according to one embodiment of the present invention.

FIG. 8 shows an exemplary screenshot of a user interface to Create a Form according to one embodiment of the present invention.

FIG. 9 shows an example of a generated XSD file for European Union Contract Notice according to one embodiment of the present invention.

FIG. 10 shows a screenshot of a user interface XML Publisher Data Definitions according to one embodiment of the present invention.

FIG. 11 shows an exemplary screenshot of a user interface to Create a Template according to one embodiment of the present invention.

FIG. 13 shows an example of the extensible markup language (XML) output file transmitted to the entity according to one embodiment of the present invention.

DETAILED DESCRIPTION

Figure 1:
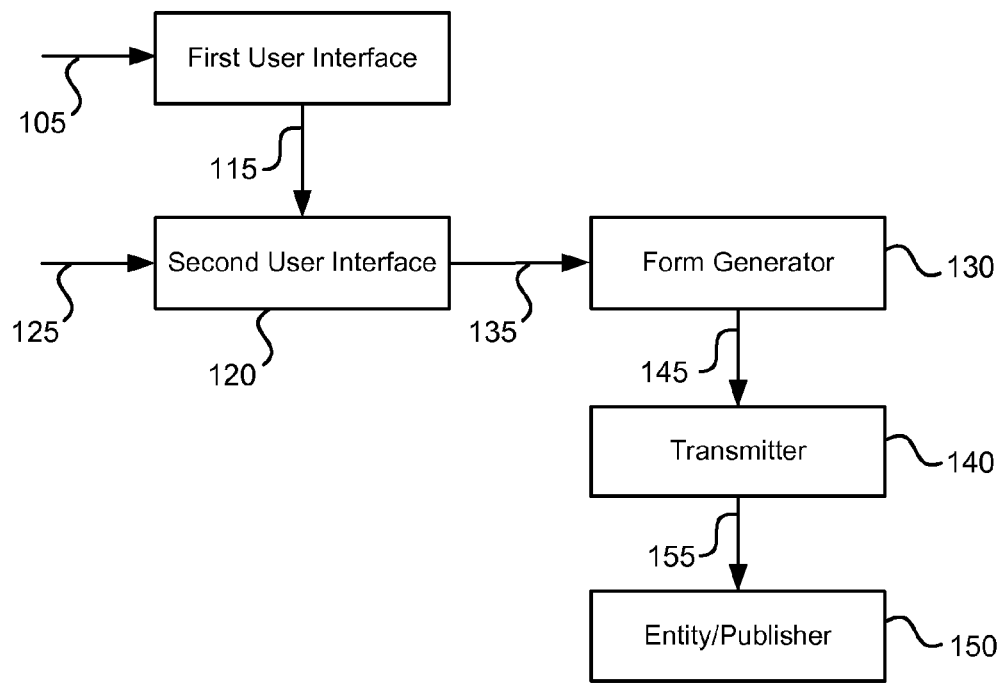
FIG. 1 shows one system embodiment of the present invention for flexible creation and publication of forms.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "creating" or "transferring" or "executing" or "determining" or "instructing" or "issuing" or "halting" or "clearing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A Method and System for Flexible Creation and Publication of Forms

In one embodiment of the present invention, the user may obtain the form from the entity by downloading it through the entity's website. Generally an entity is a third party, e.g., European Union Publication Office. The form may be in extensible markup language (XML) or any other format (e.g., Microsoft Word and Adobe PDF). Obtaining the form from the entity's website enables the user to determine the fields and the format (e.g., sections) as required by the entity. After modeling the electronic form after format information as prescribed by the entity, the user can begin creating the building blocks of the form by creating fields and grouping the prescribed fields to create section and grouping the sections in order to create pages of the electronic form. The user may utilize the extensible markup language (XML) format or alternatively DTD or XSD format of the created electronic form in order to map the form's fields and sections such that they are sent in a sequence compliant with the entity's requirement.

Referring now to FIG. 1, one system embodiment of the present invention for flexible creation and publication of an electronic form is shown. The system 100 comprises a first user interface 110, a second user interface 120 and a form generator 130. A transmitter 140 may be used for transmitting the created form to an entity/publisher 150. The first user interface 110 allows a user to generate a form by allowing a user to specify 105 fields and their allowable values and screen location for an electronic form. A mapping may also be generated which maps the metadata of the form to a prescribed format as maintained by a third party, e.g., an entity. The generated electronic form and mapping 115 are sent to the second user interface 120 where a user is allowed to fill in 125 the electronic form 115 with data in order to create a populated form 135. The populated form 135 is then sent to a form generator 130 where an electronic message 145 is automatically created that is compliant with the prescribed format. The electronic message 145 is sent to the transmitter 140 where the electronic message 145 is transmitted 155 to the entity/publisher 150 requiring the form. The functionality of each of these components is described in detail and in conjunction with a flow diagram of FIG. 2.

Figure 2:
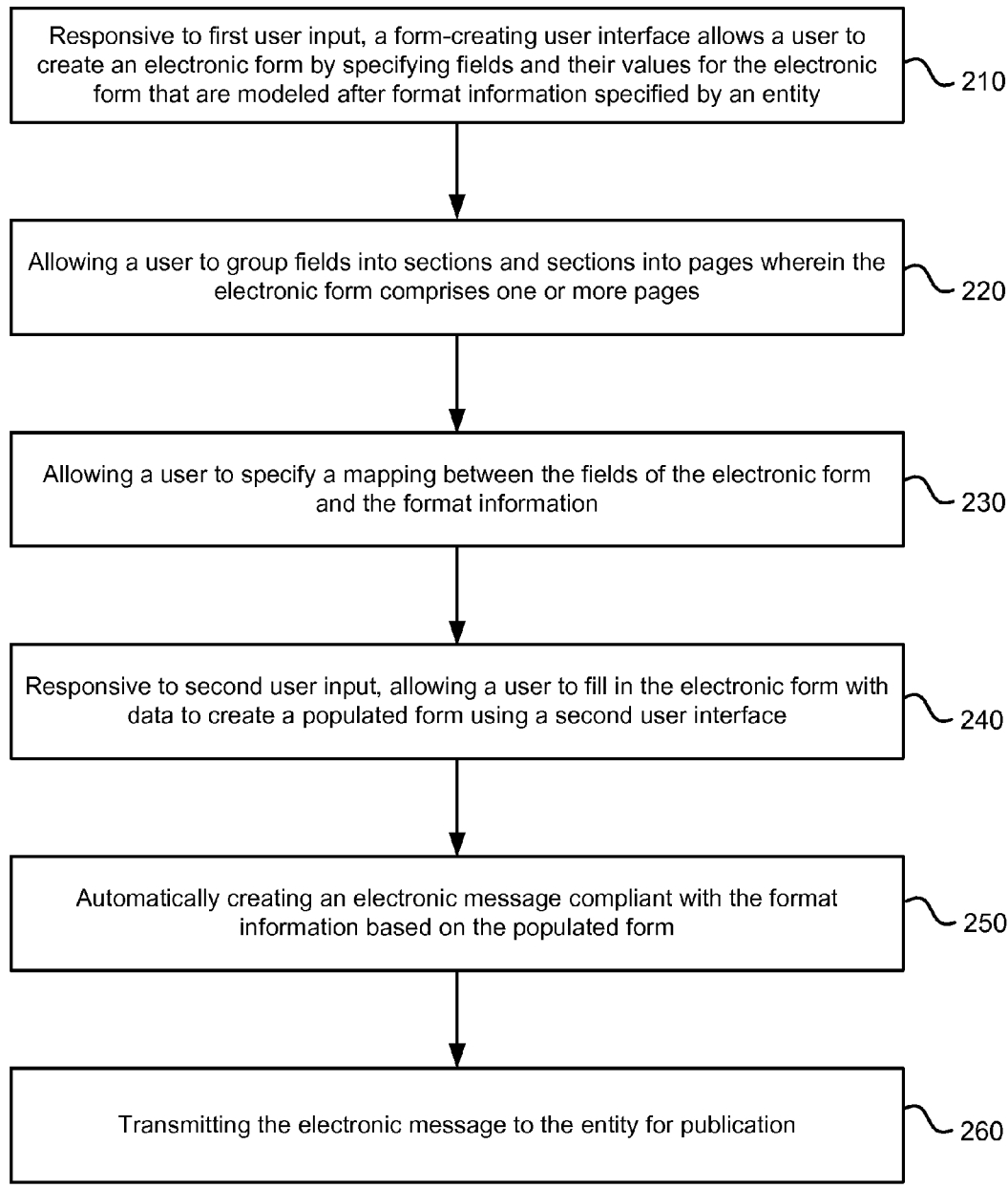
FIG. 2 shows a flow diagram of a computer implemented process for flexible creation and publication of forms.

Referring now to FIG. 2, a flow diagram 200 of a computer implemented process for flexible creation and publication of an electronic form is shown which further describes the functionality of each component shown in FIG. 1. At step 210 responsive to first user input, a form-creating user interface allows a user to create an electronic form by specifying fields, their location and their allowable values for the electronic form that are modeled after format information specified by an entity.

Prior to using the form-creating user interface, the desired output (e.g., format information) as specified by an entity is determined. The entity may be a governmental entity such as European Union Publication Office. For example, the European Union has a central publishing organization for the advertisement of all solicitations that are over a certain monetary threshold called SIMAP, which publishes the information it receives through Tenders Electronic Daily (TED). TED can be searched by potential suppliers and as a result it increases competition and results in wider advertisement of procurements throughout the European Union.

SIMAP allows users to send information via online form, email, facsimile or extensible markup language (XML). However, the information sent must be in a prescribed format. For instance a prescribed format for a Contract Notice form for European Union is provided in FIG. 3. For example, Contract Notice for SIMAP requires field information including "organisation" and "For the attention of" to name a few.

Referring still to step 210, the user may obtain a form format by inspection of a website of the entity and can model the electronic form after the format information as specified by the entity (e.g., the Contract Notice form as prescribed by the European Union). In one embodiment, the prescribed form format of the entity is typically an extensible markup language (XML) structure. The building blocks of a form are fields and sections. Fields represent single data elements on a form and they may include name, phone number, email address, commodity code, or negotiation open data to name a few. Sections are collections of fields and/or other sections. Pages of the form are collection of sections. In order to model the electronic form after format information as specified by the entity, it is helpful to understand the structure of the form such as knowing which fields are required, or which sections repeat, or which fields allow predefine values to name a few.

After modeling the electronic form after format information such as the Contract Notice Form as prescribed by the European Union in FIG. 3, the user can begin creating the building blocks of the form, fields and sections, using a form-creating user interface (e.g., first user interface 110). In the preferred embodiment of the present invention, the first user interface 110 may be based upon the commercially available Oracle Sourcing Mini-Pack J (post IIi.10, released February, 2005) from Oracle Corporation, 500 Parkway, Redwood Shores, Calif. 94065, however, many other well known techniques may also be used.

The user creating the form selects the administration tab. A screen shot of "Abstract and Forms" page of the form-creating user interface is shown in FIG. 4. A number of different buttons are available to the user such as "Create Form" 410 button and "Manage Sections and Fields" 420 button. It is appreciated that a button is a mean to make a selection. As such, a button may be a tab, a portion of a tab or any other mean to make a selection. In order to create a field, the user selects the "Manage Sections and Fields" 420 button. It is appreciated that selecting a button in the form-creating user interface may result in other information, values and buttons becoming available to the user in a pop-up format, dropdown menu, tabular format, HTML format or any other equivalent format thereof.

Upon selecting "Manage Sections and Fields" 420 button additional information is presented to the user that enables the user to search the fields and sections that have been created. Alternatively the user is allowed to update the fields and sections already created or alternatively to create new fields and sections. A screen shot for when "Manage Sections and Fields" 420 button is selected is shown in FIG. 5. As shown in FIG. 5, the user interface allows the user to search for a field or a section by entering the name 510 or the code 520 identifying the field or section. Moreover, the user interface enables the user to update the field and/or section already created by selecting the "Update" 530 button. In order to create a field, the "Create Field" 540 button is selected. Alternatively, in order to create a section, the "Create Section" 550 button is selected.

Selecting "Create Field" 540 button, a Create Field screen appears as shown in FIG. 6. The "Create Field" screen may contain field definitions such as code 610, name 620, description 630, value type 640, list of values 650, and status 660. It is appreciated that the field definition provided is not an exhaustive list and other field definitions may be added or deleted from the list presented.

Some field definitions are required field definition as denoted by an asterisk (e.g., code 610 and name 620). Code 610 is required to identify the field. Name 620 is associated with the field. Description 630 is an optional field that presents a tip to the user populating the created form. Value type 640 specifies the type of data that the user populating the form is allowed to enter. Various data types may be selected such as text, number, date, date/time, and amount to name a few. List of values 650 is used to limit the data input to only a predefined set of values. By selecting the flashlight to the right of this field, the user may select the value set or alternatively the user may select "Manage Value Sets" 670 tab in order to create a new value set. Status 660 is used to indicate whether the field in question is in draft mode or in active mode. When the user initially enters the screen, the value in the list is set to draft. The user can edit the code 610, name 620, and other properties of the field or delete the field as long as the field is in a draft mode. Once the user is done creating the field, the status is changed to active mode in order to enable the user to use it in creating a section and subsequently to use the created section to create the pages of the form. Once in active mode, the user can only make the field inactive. Alternatively, the user may utilize system fields where data can be pulled from electronic messages (e.g., negotiation) created and published by the entity to become part of the form, thereby reducing chances of error in entering data.

Figure 7:
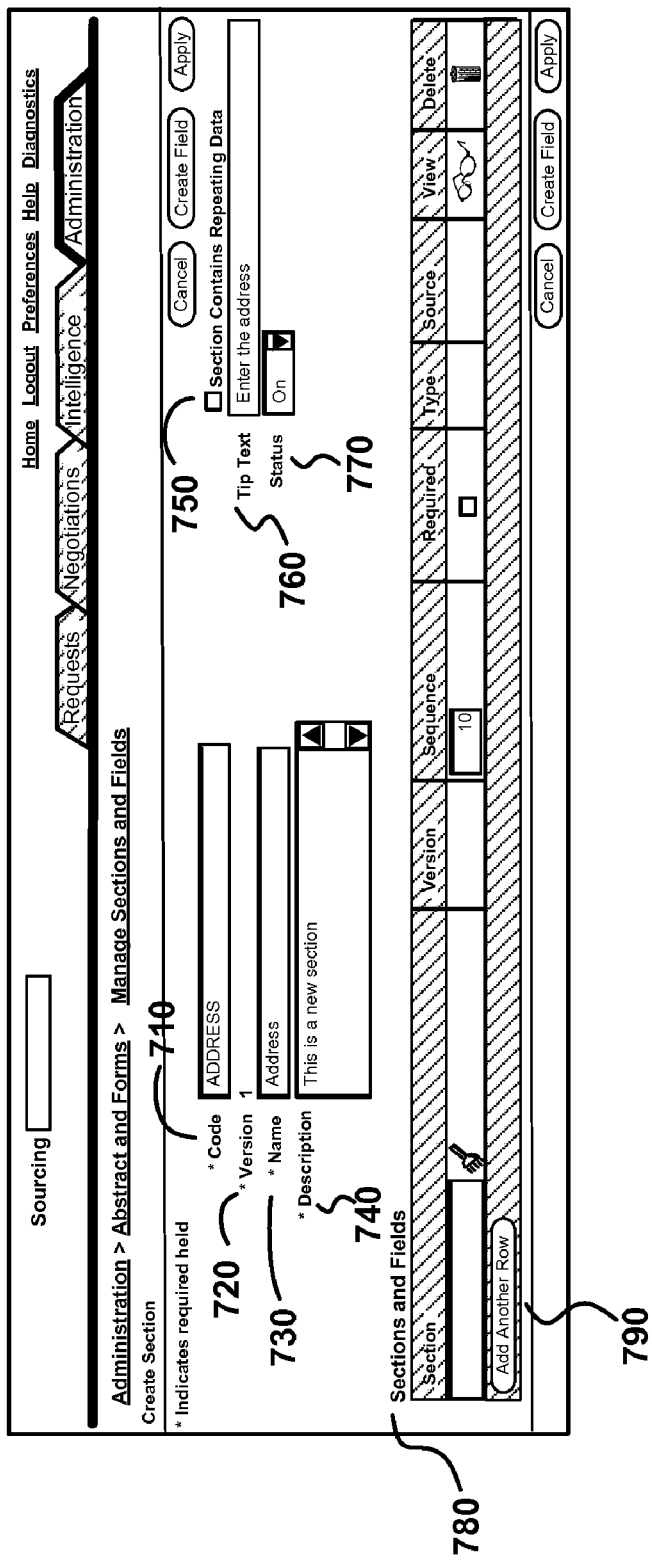
FIG. 7 shows an exemplary screenshot of a user interface to Create Sections according to one embodiment of the present invention.

Once fields have been created or updated, the user can group the fields or then existing sections in order to create one or more sections. A form is a collection of pages and pages may be compiled from sections which may be compiled from other fields or sections. Referring again to FIG. 2, at step 220 the user is allowed to group fields into sections and sections into pages wherein the electronic form comprises one or more pages. As discussed above the user interface allows the user to create a section by selecting "Create Section" 550 tab as shown in a screen shot of FIG. 5. When the user selects to create a section, the user is presented with a set of information in pop-up format, dropdown menu, tabular format, HTML format or any other equivalent format thereof. A screen shot of information presented to the user is shown in FIG. 7. A section may be defined by properties such as code 710, version 720, name 730, description 740, section contains repeating data 750, tip text 760, status 770 and sections and fields 780. It is appreciated that the list of properties presented is not an exhaustive list and other properties may be added or deleted from the list presented.

Some of the properties are required as denoted by an asterisk (e.g., code 710, name 730 and description 740). Code 710 is required to identify the section. Version 720 is a display only field that is updated when a new version of the section is created. Name 730 is associated with the section and it is presented to the user that will ultimately be entering the data into the created form in order to create a populated form. Description 740 is presented to the user creating the form but not to the user entering the data into the created form to create a populated form. Section contains repeating data 750 identifies the section that repeats. Tip text 760 is presented to the user entering the data into the created form as a tip to populate the form. Status 770 is used to indicate whether the section in question is in draft mode or in active mode. When the user initially enters the screen, the value in this list is in draft mode. The user can edit the code 710, name 730, and other properties of the section or delete the section when in draft mode. When the user is done creating the section, the status is changed to active mode in order to allow the user to create pages of the form. When in active mode, the user can only make the section inactive. Sections and fields 780 enables the user to add another row 790 in the sections and fields 780 table by typing the name of the field or section, or by selecting the flashlight next to the name to select the section or field that the user wishes to add. Moreover, the sequence of section and field within the section can be set to ensure that the ordering is in proper order as the user desires.

Figure 8:
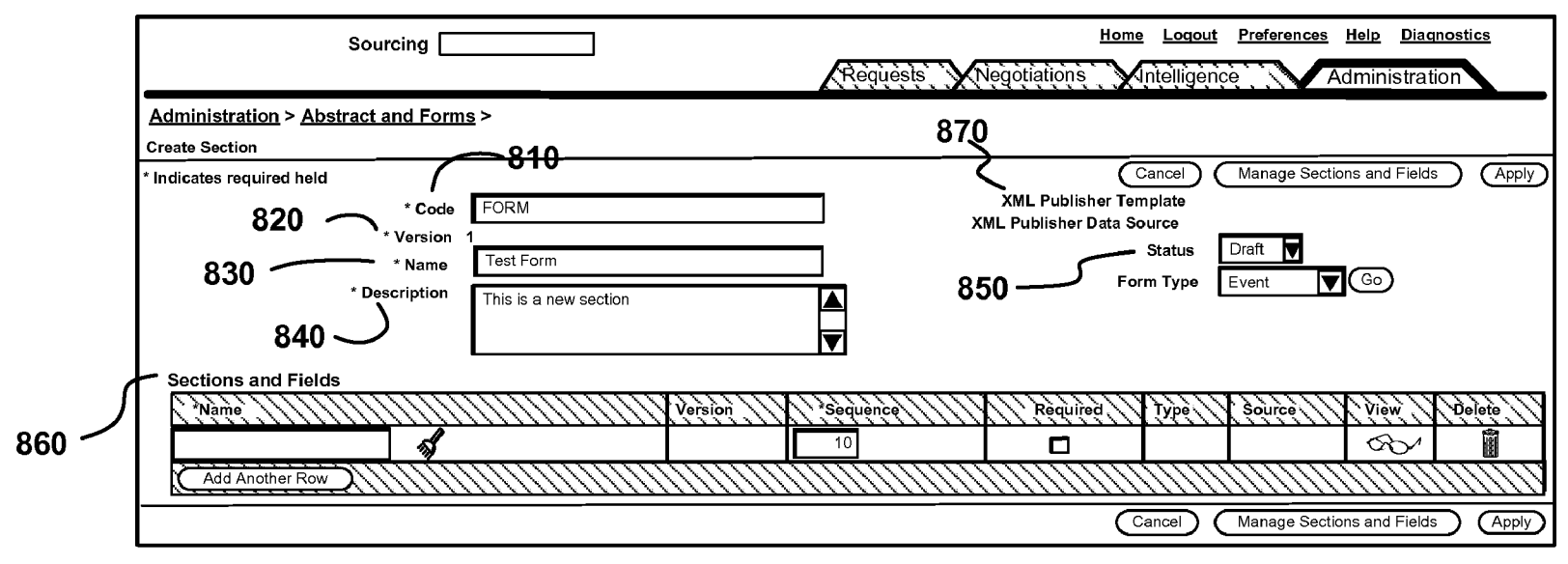

When sections of the form are created, the user can collect the sections together in order to create the pages of a form. A screen shot of a user interface enabling the user to create a form is shown in FIG. 4 as discussed above. By selecting the "Create Form" 410 tab, the user is allowed to create the form by grouping the sections created together in order to create the pages of a form. A screen shot of the user interface when the user selects the "Create Form" 410 tab is shown in FIG. 8. The user is presented with a set of information in pop-up format, dropdown menu, tabular format, HTML format or any other equivalent format thereof. The form may be defined by properties such as code 810, version 820, name 830, description 840, status 850 and sections and fields 860 to name a few. It is appreciated that the list of properties presented is not an exhaustive list and other properties may be added or deleted from the list presented. The user can select the appropriate properties and add items in the same sequence as the form that the user is modeling. When the form is created, an XSD file is created.

Referring again to FIG. 2, at step 230 the user is allowed to specify a mapping between the fields of the electronic form and the format information. The mapping may specify an ordering of fields and the data format for the fields to be transmitted to the entity. In the preferred embodiment of the present invention the generated XSD file may be used by XML Publisher to map the XSD file to the third party XSD/DTD file such that the output extensible markup language (XML) generated from the Form is acceptable to the third party system. When the form and mapping are created and activated, an extensible markup language (XML) Schemas (XSD) file is created automatically. A sample XSD file for European Union Contract Notice is shown in FIG. 9.

In the preferred embodiment of the present invention, in order to map the form created to a format acceptable by the third party, entity (e.g., European Union), the user selects the XML Publisher and selects "Data Definition". A screen shot of the interface when the user selects the "Data Definition" 130 tab is shown in FIG. 10. In order to start, the user enters "Sourcing" into application 1010 search criteria and press "Go" 1040 tab. Typing "Sourcing" allows the user to view all of the data source files related to the user interface as described above. Therefore, the user is presented with a set of files listed as "Data Source for Sourcing from XXX," where XXX is the name of the form created above with its corresponding version. In this example, XXX is CONTRACT_NOTICE. When the appropriate file is found, the link 1020 to the file is selected and saved to a place on the user's local machine.

The XSD or DTD file from the third party entity (e.g., European Union) that the user is mapping to is obtained. The XSD or DTD file are usually available on the entity's website. When the XSD or DTD file from the entity and the XSD from the form created are available the user can start mapping to create a mapped XSL file. In the preferred embodiment of the present invention, a software package such as Stylus Studio may be used in order to map the form to a format acceptable by the third party. Stylus Studio allows the user to drag and drop from one XSD file to another to map the elements in the two XSD files to each other.

Figure 11:
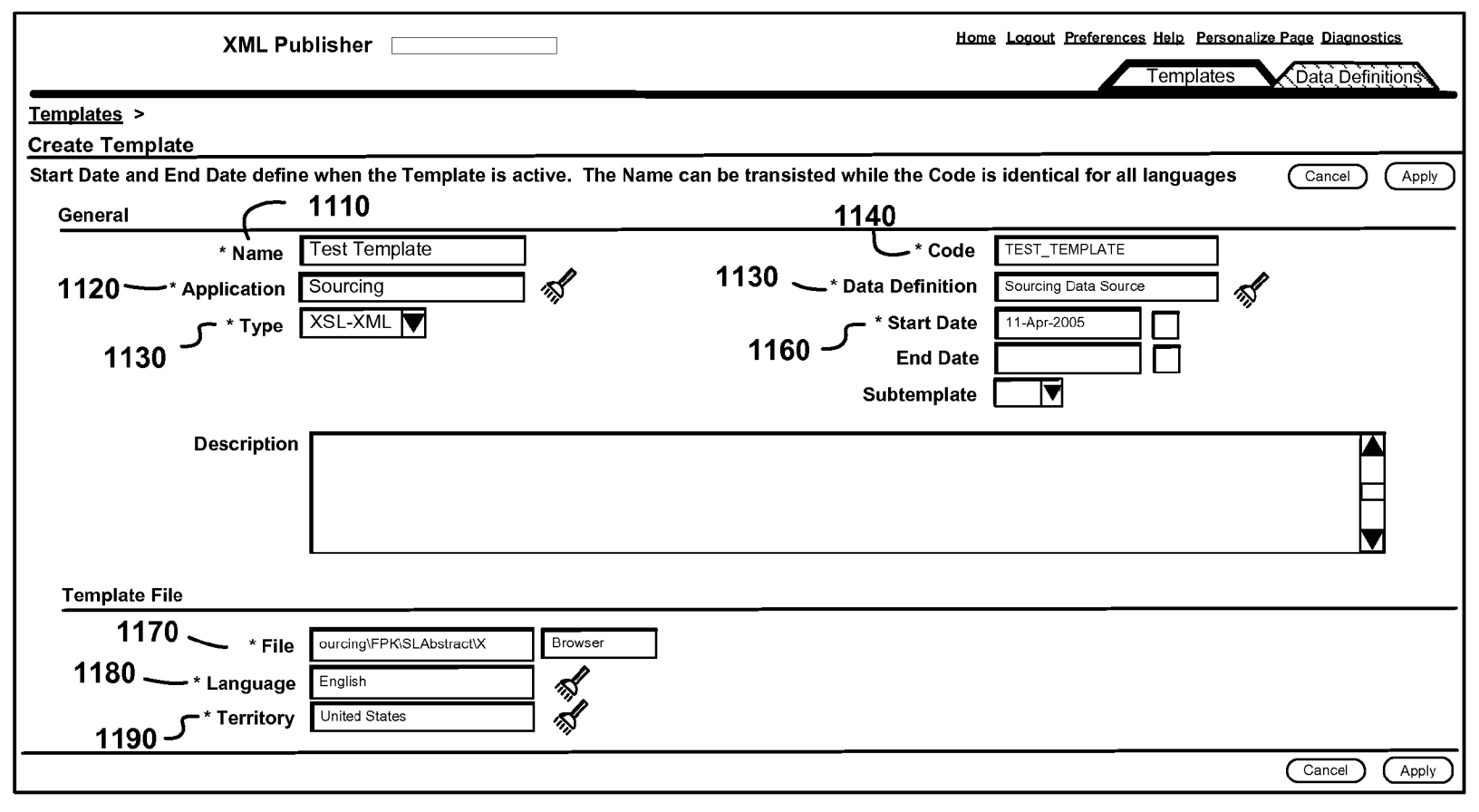

Once the XSL file that contains the mapping is created, the file is uploaded into the XML Publisher application. In the preferred embodiment of the present invention the user utilizes the XML Publisher in order to upload the mapped file. Using XML Publisher, the user creates a new template in XML Publisher. In the preferred embodiment of the present invention in order to create a new template, the user selects the "XML Publisher Administrator" and selects the "Create Template" button. A snapshot of the user interface that appears as a result of selecting "Create Template" button is shown in FIG. 11. The user is presented with a set of information in pop-up format, dropdown menu, tabular format, HTML format or any other equivalent format thereof.

The interface presented contains various fields in order to create the template. For example, the create template interface may contain plurality of required fields such as name 1110, application 1120, type 1130, code 1140, data definition 1150, start date 1160, file 1170, language 1180 and territory 1190. Again as discussed above, the list provided is not an exhaustive list and other fields and properties may be added or deleted accordingly.

Name 1110 identifies the template. Application 1120 should indicate "Sourcing" as mentioned above. Type 1130 is the type of the file, which is XSL-XML in this example. Code 1140 is a unique code identifying the template. Data definition 1150 allows the user to search the list of values for the application "Sourcing" and to select the data definition file that was created for the form, which is data source XSD in this case. Start date 1160 indicates when the template will become effective. File 1170 enables the user to select the XSL file that the user created using mapping tools described above.

When the template is created, the template should be associated with the form created. In order to associate the template with the form created, the name of the template is specified in the XML Publisher template field 870 on the create form screen as shown in the screen shot of FIG. 8.

Figure 12:
FIG. 12 shows an exemplary screenshot for a Contract Notice Form generated as viewed by a user according to one embodiment of the present invention.

Once the template is associated with the form, the form is ready to be populated with data. The user may associate the form to an event/negotiation even in absence of the XSL file. Referring back to FIG. 2 at step 240 the user is allowed to fill in the form with data to create a populated form using a second user interface (e.g., Second User Interface 120). A screenshot of the electronic form presented to the user to be populated is shown in FIG. 12. As seen from FIG. 12, the electronic form presented is modeled after the format information (e.g., European Union Contract Notice in FIG. 3). Accordingly, the user can simply fill out the form presented in order to populate the form. As such, the populated form is modeled after the format information, hence it complies with the requirement of the entity (e.g., European Union).

When the form is filled out by the user, an extensible markup language (XML) file of the populated form is created by selecting "Generate XML" 1210 button. Referring back to FIG. 2 at step 250, when the user selects "Generate XML" 1210 button, an electronic message compliant with the format information based on the populated form is automatically created. The populated form and the mapping associated with the form are used to automatically generate a data structure that is compliant with the form expected by the entity. In order to create the extensible markup language (XML) file automatically, the form generator 130 shown in FIG. 1 may be used. A sample extensible markup language (XML) file that is created automatically for European Union Contract Notice is shown in FIG. 13. Once the extensible markup language (XML) file in compliance with the format information based on the populated form is created, the file is ready for transmission. Accordingly, at step 260 the electronic message (extensible markup language (XML) file) may be transmitted to the entity (e.g., European Union) for publication. The file may be transmitted using the transmitter 140 to the entity/publisher 150 as shown in FIG. 1. The transmitted file may be used by the entity (e.g., European Union) in conjunction with the same or similar user interface in order to publish the received electronic message.

As a result of this automated process for flexible creation and publication of forms, forms can be created without a need to modify the software program for each entity. Moreover, embodiments of the present invention eliminate the need to manually print forms as well as eliminate the need to manually enter the information and to manually transmit the form via facsimile to the entity requiring the form. Furthermore, embodiments of the present invention eliminate the need for entities that require the forms to manually enter and maintain the information in order to display it on their external facing websites such that suppliers could view all ongoing procurement activities. Consequently, the embodiments of the present invention provide a flexible automated process for creating and publishing forms that save time and money as well as creating more competition in the market.

It is appreciated that the method and system described may be extended to where the fields and sections described can be created on a website in order to allow one to adopt the same look and feel of a company or entity's website while keeping the fields and sections up to date. Extending the system to such scenario enables one to incorporate the look and feel of the company/entity's website while it displays the procurement opportunities on their external website. Moreover, this feature allows one to download the procurement RFQ in different formats (e.g., pdf format), making it accessible globally.

Figure 14:
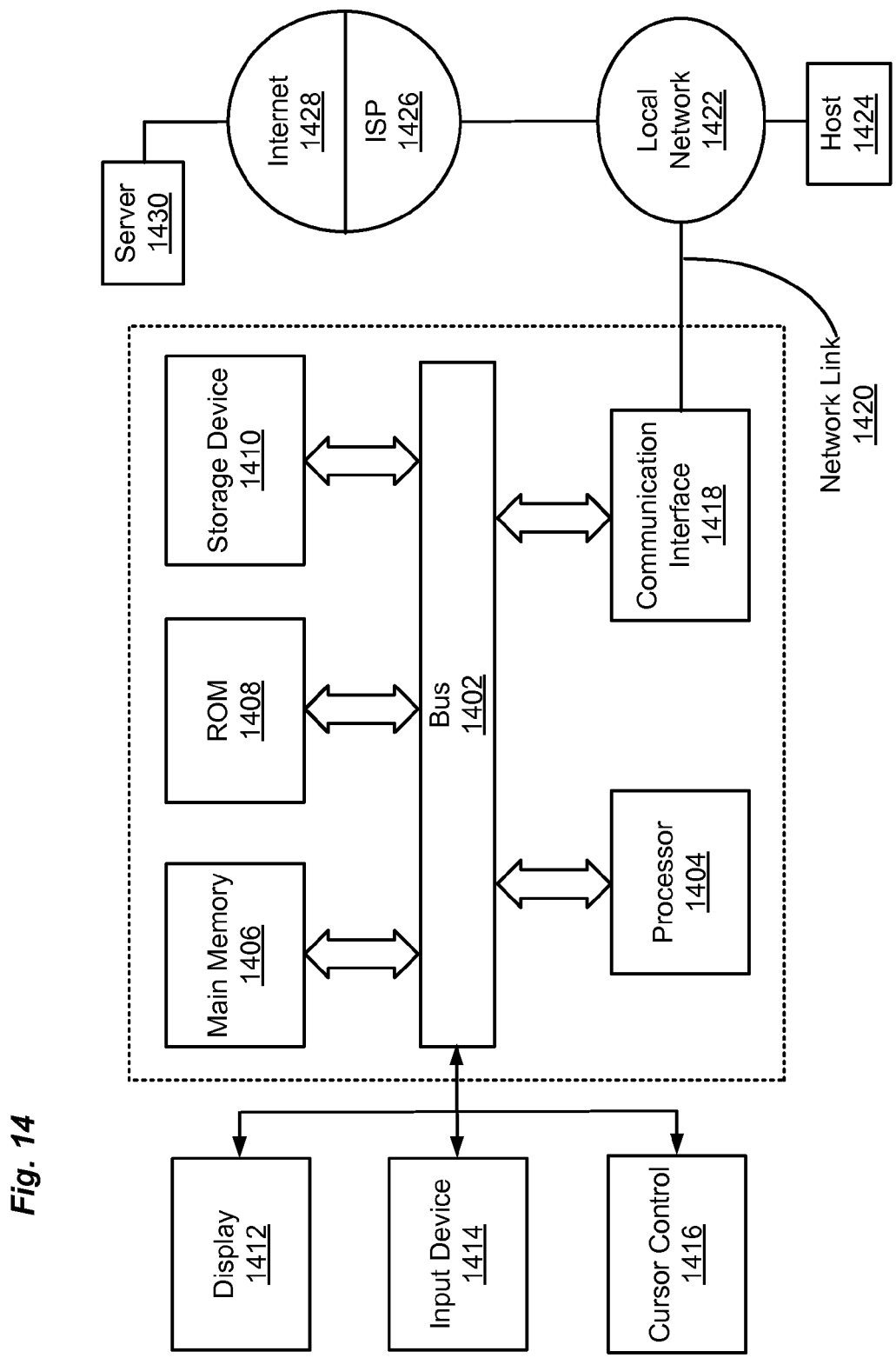
FIG. 14 illustrates a general purpose computer system that may serve as a platform for embodiments of the present invention.

FIG. 14 is a block diagram that illustrates a computer system 1400 upon which an embodiment of the present invention may be implemented. Computer system 1400 may implement the method 200 for flexible creation and publication of forms as shown in FIGS. 1-13 and includes a bus 1402 or other communication mechanism for communicating information, and a processor 1404 coupled with bus 1402 for processing information. Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Computer system 1400 further includes a read only memory (ROM) 1408 or other static storage device coupled to bus 1402 for storing static information and instructions for processor 1404. A non-volatile storage device 1410, such as a magnetic disk or optical disk, is provided and coupled to bus 1402 for storing information and instructions and may store the persistent internal queue.

Computer system 1400 may be coupled via bus 1402 to an optional display 1412, such as a cathode ray tube (CRT), for displaying information to a computer user. An optional input device 1414, including alphanumeric and other keys, may be coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412.

The invention is related to the use of computer system 1400 for flexible creation and publication of forms. According to one embodiment of the invention, the interface is used in response to processor 1404 executing one or more sequences of one or more instructions contained in main memory 1406 e.g., to implement process 200. Such instructions may be read into main memory 1406 from another computer readable medium, such as storage device 1410. Execution of the sequences of instructions contained in main memory 1406 causes processor 1404 to perform the process steps described herein. One or more processors in a multi-processing arrangement may also be employed to execute the sequences of instructions contained in main memory 1406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1404 for execution. Such a medium may take many forms, including but not limited to, non-volatile media, volatile media, and transmission media. Non-volatile media includes, for example, optical or magnetic disks, such as storage device 1410. Volatile media includes dynamic memory, such as main memory 1406. Transmission media includes coaxial cables, copper wire and fiber optics, including the wires that comprise bus 1402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1404 for execution. For example, the instructions may initially be carried on a magnetic disk of a remote computer. The remote computer can load the instructions into its dynamic memory and send the instructions over a telephone line using a modem. A modem local to computer system 1400 can receive the data on the telephone line and use an infrared transmitter to convert the data to an infrared signal. An infrared detector coupled to bus 1402 can receive the data carried in the infrared signal and place the data on bus 1402. Bus 1402 carries the data to main memory 1406, from which processor 1404 retrieves and executes the instructions.

The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the worldwide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of carrier waves transporting the information.

Computer system 1400 can send and receive messages through the network(s), network link 1420 and communication interface 1418. In the Internet example, a server 1430 might transmit a requested code for an application program through Internet 1428, ISP 1426, local network 1422 and communication interface 1418. The received code may be executed by processor 1404 as it is received, and/or stored in storage device 1410, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method of creating an electronic form for publication of information related thereto, said method comprising:
  under the control of one or more computer systems configured with executable instructions,
    receiving by a form-creating user interface, first user input specifying at least:
    fields and allowable values therefore;
    one or more groupings of one or more of the specified fields into one or more sections;
    one or more groupings of one or more of the sections into one or more pages; and a mapping between the specified fields and format information specified by an entity;

creating, based at least in part on the allowable values for the specified fields, said electronic form that includes the specified fields, said electronic form being organized according to the specified one or more groupings of one or more specified fields into the one or more sections, and specified one or more groupings of one or more sections into one or more pages;

receiving second user input comprising data for populating the specified fields;

populating the specified fields to create a populated form from the electronic form;

creating, based at least in part on the mapping, an electronic message that comprises the data organized according to the format information; and transmitting said electronic message to said entity for publication thereof by said entity.

2. The computer implemented method of claim 1 wherein said entity is a government entity and wherein said electronic form is related to procurement.

3. The computer implemented method of claim 1, wherein said fields are specified by searching and selecting available fields stored in a database.

4. The computer implemented method of claim 1, wherein said form-creating user interface is presented in a pop-up window.

5. The computer implemented method of claim 1, wherein said form-creating user interface is presented in a dropdown menu.

6. The computer implemented method of claim 1, wherein said form-creating user interface is presented in a tabular format.

7. The computer implemented method of claim 1, wherein said form-creating user interface is presented in HTML form.

8. The computer implemented method of claim 1, wherein said generated electronic message is in extensible markup language (XML) format.

9. The computer implemented method of claim 1, wherein a field further comprises:
   a code for identifying said field;
   a name for association with said field;
   an optional description for presentation to a user as a tip;
   a value type for specifying the type of data that a user is allowed to enter;
   a list of values for limiting the data input to only a predefined set of values; and
   a status for determining whether said field is draft wherein said field can be further edited or whether said field is active wherein said field can be added or made inactive.

10. The computer implemented method of claim 1, wherein a section further comprises:
   a code for uniquely identifying said section;
   a version for updating when a new version of said section is created;
   a name for association with said section;
   an optional description for describing said section;
   a section containing repeating data for identifying whether said section repeats;
   a tip text for presentation of specific instructions to a user; and
   a status for determining whether said section is draft wherein said section can be further edited or whether said section is active wherein said section can be added or made inactive.

11. A system for creating an electronic form for publication of information related thereto, said system comprising:
   one or more processors; and
   memory including instructions executable by the one or more processors to cause one or more computers of the system to implement at least:
      a first user interface to allow a user to specify at least:
         fields and allowable values therefore;
         one or more groupings of one or more of the specified fields into one or more sections;
         one or more groupings of the one or more sections into one or more pages; and
         a mapping between the specified fields and format information specified by an entity;
      a second user interface coupled to said first user interface to allow a user to fill in said electronic form with data to create a populated form, said electronic form being organized according to the specified one or more groupings of one or more specified fields into one or more sections, and specified one or more one or more groupings of one or more or more sections into one or more pages;
      a form generator coupled to said second user interface for creating, based at least in part on the mapping, an electronic message compliant with said format information based on said populated form, said electronic message including said data organized according to the format information; and
      a transmitter coupled to said form generator for transmitting said electronic message to said entity for publication thereof by said entity.

12. The system as described in claim 11, wherein said generated electronic message is in extensible markup language (XML) format.

13. A computer-useable storage medium having computer-readable program code stored thereon for creating an electronic form for publication thereof, said computer-readable program code comprising:
   instructions that cause one or more processors to, responsive to first user input, allow a user to create said electronic form using a form-creating user interface, wherein said form-creating user interface is operable to allow said user to specify at least:
      fields and allowable values therefore;
      one or more groupings of one or more specified fields into one or more sections;
      one or more groupings of one or more of the sections into one or more pages; and
      a mapping between the specified fields and format information specified by an entity;
   instructions that cause the one or more processors to, responsive to second user input, allow a user to fill in said electronic form with data to create a populated form, said electronic form being organized according to the specified one or more groupings of one or more specified fields into one or more sections, and specified one or more groupings of one or more sections into one or more pages;
   instructions that cause the one or more processors to create an electronic message that includes the data organized according to the format information; and
   instructions that cause the one or more processors to transmit said electronic message to said entity for publication thereof by said entity.

14. The computer-useable storage medium as described in claim 13, wherein said generated electronic message is in extensible markup language (XML) format.

15. The computer implemented method of claim 1, wherein the format information specifies a plurality of elements of a schema and wherein the mapping associates metadata of the form with the elements.

16. The system of claim 11, wherein the format information specifies a plurality of elements of a schema and wherein the mapping associates metadata of the form with the elements.

17. The computer-usable storage medium of claim 13, wherein the format information specifies a plurality of elements of a schema and wherein the mapping associates metadata of the form with the elements.

18. The computer-implemented method of claim 1, wherein creating said electronic form includes generating a schema definition file, wherein the mapping associates one or more elements of the generated schema definition file with one or more corresponding elements of a file of the entity.

19. The system of claim 11, wherein the form generator is operable to create the electronic form, wherein creating said electronic form includes generating a schema definition file, wherein the mapping associates one or more elements of the generated schema definition file with one or more corresponding elements of a file of the entity.

20. The computer-usable storage medium of claim 13, further comprising:

instructions that cause the one or more processors to create the electronic form, wherein creating said electronic form includes generating a schema definition file, wherein the mapping associates one or more elements of the generated schema definition file with one or more corresponding elements of a file of the entity.

* * * * *